July 22, 1958

S. REZNEK 2,843,934

DEVICE FOR DEMONSTRATING EFFECTS OF
VARYING INJECTION RATES
Filed Dec. 31, 1956

INVENTOR.
SOLOMON REZNEK
BY
Elmer J Lawson
AGENT

United States Patent Office 2,843,934
Patented July 22, 1958

2,843,934

DEVICE FOR DEMONSTRATING EFFECTS OF VARYING INJECTION RATES

Solomon Reznek, Albany, N. Y., assignor to Cook-Waite Laboratories, Inc., New York, N. Y., a corporation of Delaware Application December 31, 1956, Serial No. 631,534

3 Claims. (Cl. 32—71)

This invention relates to a device for demonstrating the relative pressures obtained on injection from a dental hypodermic syringe into tissues, such as the human jaw, at different injection rates.

The rate at which the contents of a dental hypodermic syringe are injected into human tissue is of importance in dentistry because a too-fast injection rate often causes a tearing or rupturing of the mouth tissue, which leads to immediate, as well as post-operative, soreness. This tearing of the mouth tissue arises from the fact that the tissue of many of the injection sites in the mouth is very dense and diffusion through such tissue is slow. Thus, while a slow injection rate allows sufficient time for diffusion to occur, a too-fast injection rate leads to a locally high concentration of the injected solution. The slow diffusion through the dense tissue, coupled with the high local concentration of injected liquid, causes a swelling and eventual rupture or tearing of the tissue.

Although the importance of a slow injection rate is understandable on theoretical grounds, in practice this importance may not always be sufficiently appreciated, and therefore it is the principal object of the invention to provide a device for demonstrating the relative pressures obtained using different injection rates.

A further object is the provision of such a device in a compact form and which can be readied for demonstration in a short time.

Figure 1:
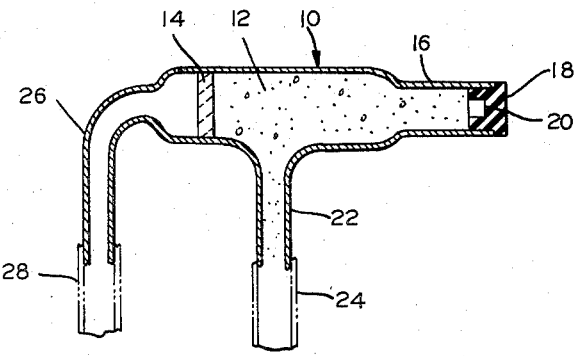
Figure 2:
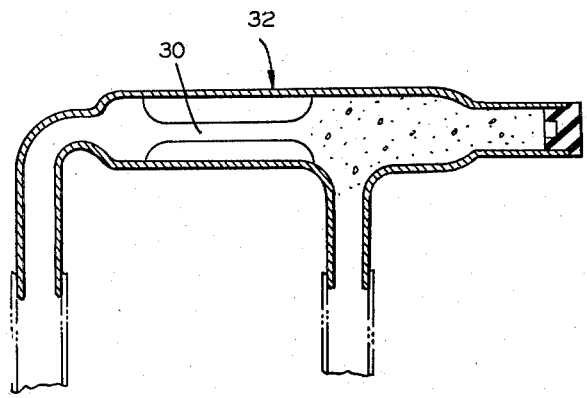

With the objects thus briefly stated, the invention comprises details of construction and operation which are hereinafter set forth in the specification when read in conjunction with the accompanying drawings in which Figure 1 is a view in section of the device constructed in accordance with the invention and Figure 2 is a view in section of an alternative embodiment of the invention.

Referring to Figures 1 and 2, the devices there illustrated are indicated in their entirety by the numeral 10 in Figure 1 and 32 in Figure 2. The device 10 comprises a chamber 12 made, for instance, of glass and having sealed thereto a fritted disc 14 corresponding to a Corning 20 mm. fine-grain porosity disc for the simulation of animal tissue. The chamber 12 terminates at one end in a tubulature 16 for reception of a rubber stopper 18, having a thinned-out central portion 20 which is readily punctured by the needle of a hypodermic syringe while providing a liquid tight seal with said needle. To the chamber 12 is also fitted means for measuring pressure, shown here as a side-arm 22 which is removably connected by a hose 24 to a pressure gauge (not shown). The semi-permeable means shown here as the disc 14 communicates with a drain or exhaust region, shown here as a drawn-out portion or tubulature 26, removably connected to a rubber hose 28 which leads to a drain or receptacle.

In operation the chamber 12 is filled with a liquid, as, for instance, water, between the fritted disc 14 and the tubulature 16. When a hypodermic needle is inserted in the stopper 18 through 20 and the plunger driven down, the contents of the syringe are forced under pressure against the fritted disc 14 which simulates animal tissue by leaking somewhat under the increased pressure. The resultant pressure is shown on the pressure gauge and said pressure can thus be demonstrated to increase and to attain higher maximal pressures as faster injection rates are employed. The liquid forced through the orifices of the fritted disc is collected at the exhaust 26 in a suitable receptacle or, if desired, led through 28 to a drain.

In the embodiment shown in Figure 2, the semi-permeable means instead of being a fritted disc is a capillary tube 30. The diameter and length of the capillary channel are readily selected to afford the desired flow characteristics by simple trial.

I claim:

1. A device for demonstrating the dependency of local tissue pressure increase on increasing rate of liquid injection which comprises a chamber filled with liquid, resilient closure means for said chamber, said resilient closure means being puncturable by the needle of a hypodermic syringe while being held in liquid-tight engagement by the resiliency of the closure material and permitting the driving of liquid from said hypodermic syringe into said chamber under pressure, means for measuring pressure variations in said chamber, and semipermeable means simulating the flow characteristics of liquid through animal tissue and partitioning said chamber from exhaust means.

2. A device for demonstrating the dependency of local tissue pressure increase on increasing rate of liquid injection which comprises a chamber filled with liquid, said chamber terminating at one end in a tubulature fitted with a resilient closure puncturable by the needle of a hypodermic syringe while being held in liquid-tight engagement by the resiliency of the closure material and permitting the driving of liquid from said hypodermic syringe into said chamber under pressure, means for measuring pressure variations in said chamber, and a fritted glass semi-permeable barrier simulating the flow characteristics of liquid through animal tissue and partitioning said chamber from an exhaust region.

3. A device for demonstrating the dependency of local tissue pressure increase on increasing rate of liquid injection which comprises a chamber filled with liquid, said chamber terminating at one end in a tubulature fitted with a resilient closure puncturable by the needle of a hypodermic syringe while being held in liquid-tight engagement by the resiliency of the closure material and permitting the driving of liquid from said hypodermic syringe into said chamber under pressure, means for measuring pressure variations in said chamber, and a capillary channel simulating the flow characteristics of liquid through animal tissue and partitioning said chamber from an exhaust region.

No references cited.